3,813,360
7H-THIAZOLO[3,2-a]PYRIMIDIN-7-ONES
Delme Evans, Chalfont St. Peter, England, assignor to
Lilly Industries, Limited, London, England
No Drawing. Filed Sept. 20, 1971, Ser. No. 182,122
Claims priority, application Great Britain, Sept. 30, 1970,
46,404/70
Int. Cl. C07d 51/46
U.S. Cl. 260—25 A        1 Claim

ABSTRACT OF THE DISCLOSURE

7H - thiazolo[3,2-a]pyrimidin - 7 - ones, for example 3-methyl - 5 - phenyl - 7H - thiazol[3,2-a]pyrimidin-7-one β-aminoacryloyliminothiazoline derivatives thereof and their benzothiazole and benzothiazoline analogues possess anti-fungal, amoebicidal and anti-inflammatory activity, and may be prepared by reaction of a 2-aminothiazole or 2-aminobenzothiazole with a propiolic acid or ester thereof followed optionally by reaction with an amine, or with propiolyl chloride followed by reaction with an amine.

---

This invention relates to new chemical compounds having a heterocyclic ring structure and provides methods by which such compounds may be prepared. The compounds of the invention are useful as anti-fungal, amoebicidal and/or anti-inflammatory agents and the invention therefore also provides compositions comprising said compounds in association with a suitable carrier or diluent therefor.

According to the present invention therefore, there are provided compounds of the formula:

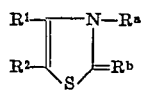

I wherein either (a) $R^a$ and $R^b$ together represent the chain

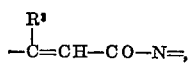

or (b) $R^a$ is hydrogen and $R^b$ represents the group =N—CO—CH=CH—NR$^7$R$^8$; $R^1$, $R^2$ and $R^3$, which may be the same or different, represent hydrogen, $C_{1-6}$ alkyl, $C_{1-6}$ alkoxy, $C_{2-7}$ carbalkoxy or phenyl, or $R^3$ is as defined above and $R^1$ and $R^2$ together represent a phenyl ring optionally substituted by one or two $C_{1-6}$ alkyl, $C_{1-6}$ alkoxy, or $C_{2-7}$ carbalkoxy; and $R^7$ and $R^8$ separately represent hydrogen or $C_{1-6}$ alkyl or together with the adjacent nitrogen represent pyrrolidino, piperidino or homopiperidino.

The term "$C_{1-6}$ alkyl" as used herein means straight and branched hydrocarbon chains having up to 6 carbon atoms such as methyl, ethyl, n.propyl, isopropyl, n.butyl, isobutyl, sec.-butyl, t.butyl, n.pentyl sec.pentyl, n.hexyl, 3-methylpentyl, 2-ethylbutyl, and 1,1-dimethylbutyl. The terms "$C_{1-6}$ alkoxy" and "$C_{2-7}$ carbalkoxy" as used herein mean the aforementioned $C_{1-6}$ alkyl groups linked to the heterocyclic nucleus through an —O— or —OCO— group respectively. Preferred alkyl substituents for use in the present invention are those mentioned above having up to 4 carbons. Preferred alkoxy substituents also contain up to 4 carbons such as methoxy, ethoxy, isopropoxy, n-butoxy, sec-butoxy, and t.butoxy whilst preferred carbalkoxy substituents are carbomethoxy and carboethoxy.

Exemplary of compounds of formula I(a) i.e. compounds of the structure:

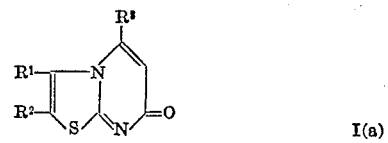

I(a)

which are of use in accordance with the invention are:

7H-thiazolo[3,2-a]pyramidin-7-one
2,3-diethyl-7H-thiazolo[3,2-a]pyrimidin-7-one
3-methyl-7H-thiazolo[3,2-a]pyrimidin-7-one
3-methyl-5-n.butyl-7H-thiazolo[3,2-a]pyrimidin-7-one
3-n.hexyl-5-methyl-7H-thiazolo[3,2-a]pyrimidin-7-one
3,5-dimethoxy-7H-thiazolo[3,2-a]pyrimidin-7-one
3,5-dimethyl-7H-thiazolo[3,2-a]pyrimidin-7-one
3-isobutyoxy-5-phenyl-7H-thiazolo[3,2-a]pyrimidin-7-one
3-carboethoxy-5-phenyl-7H-thiazolo[3,2-a]pyrimidin-7-one
3-methyl-5-phenyl-7H-thiazolo[3,2-a]pyrimidin-7-one
2,3-dimethoxy-5-carbomethoxy-7H-thiazolo[3,2-a]pyrimidin-7-one
3-methyl-5-carbomethoxy-7H-thiazolo[3,2-a]pyrimidin-7-one
3-phenyl-7H-thiazolo[3,2-a]pyrimidin-7-one
3-phenyl-5-n.propyl-7H-thiazolo[3,2-a]pyrimidin-7-one
2H-pyrimidino[2,1-b]benzothiazol-2-one
6,8-di-t.butyl-2H-pyrimidino[2,1-b]benzothiazol-2-one
4,6-diethyl-2H-pyrimidino[2,1-b]benzothiazol-2-one
4-carbomethoxy-7,9-dimethoxy-2H-pyrimidino[2,1-b]benzothiazol-2-one
8-methyl-2H-pyrimidino[2,1-b]benzothiazol-2-one
4,6,8-trimethyl-2H-pyrimidino[2,1-b]benzothiazol-2-one
4-carboethoxy-2H-pyrimidino[2,1-b]benzothiazol-2-one
4-methyl-8-methoxy-2H-pyrimidino[2,1-b]benzothiazol-2-one
7,9-diethoxy-2H-pyrimidino[2,1-b]benzothiazol-2-one whilst examples of useful compounds of I(b) i.e. compounds of the structure:

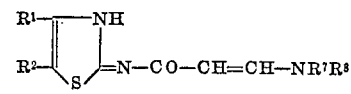

I(b)

are:

2-(β-ethylaminoacryloyl)imino-Δ$^4$thiazoline
2-(β-n.butylaminoacryloyl)-imino-Δ$^4$-thiazoline
2-(β-N,N-dimethylaminoacryloyl)imino-Δ$^4$-thiazoline
2-(β-ethylaminoacrylol)imini-4-methyl-Δ$^4$-thiazoline
2-(β-ethylaminoacrylol)imino-4,5-diethyl-Δ$^4$-thiazoline
2-(β-t.butylaminoacryloyl)imino-4-phenyl-Δ$^4$-thiazoline
2-(β-pyrrolidinoacryloyl)imino-Δ$^4$-thiazoline
2-(β-piperidinoacryloyl)imino-Δ$^4$-thiazoline
2-(β-homopiperidinoacryloyl)imino-4-methoxy-Δ$^4$-thiazoline
2-(β-ethylaminoacryloyl)iminobenzothiazoline
2-(β-N,N-dipropylaminacryloyl)iminobenzothiazoline
2-(β-n.butylaminoacryloyl)imino-5,6-dimethoxy-benzothiazoline
2-(β-n.butylaminoacryloyl)imino-5-ethylbenzothiazoline
2-(β-pyrrolidinoacryloyl)iminobenzothiazoline
2-(β-piperidinoacryloyl)iminobenzothiazoline
2-(β-n.butylaminoacryloyl)imino-6-methylbenzothiazoline
2-(β-n.butylaminoacryloyl)imino-6-methoxybenzothiazoline According to a feature of the present invention, there is provided a process for preparing the compounds of formula I comprising condensing an appropriate 2-aminothiazole or 2-aminobenzothiazole of the formula:

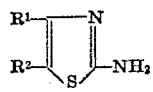

wherein $R^1$ and $R^2$ are as defined in fomula I, with a suitable propiolic acid or ester thereof of the formula:

$$R^3—C{\equiv}C—COOR^4 \qquad III$$

wherein $R^3$ is as defined above and $R^4$ is hydrogen or $C_{1-6}$, preferably $C_{1-4}$, alkyl to produce a compound of formula I(a), and thereafter, when a compound of formula I(b) is desired, reacting a compound of formula I(a) in which $R^3$ is hydrogen with an amine of the formula $HNR^7R^8$.

The condensation of compounds of formulae II and III is normally carried out in a suitable reaction solvent such as an alkanol and particularly ethanol. The reaction may be carried out at room temperature but reduced reaction times may be obtained at higher temperatures, conveniently at the reflux temperature of the reaction mixture. Improved yields may be obtained by carrying out the condensation in the presence of a basic catalyst such as a quaternary ammonium hydroxide or alkoxide, particularly tetramethyl ammonium hydroxide, methoxide or ethoxide.

In the reaction of a compound of formula I(a) in which $R^3$ is hydrogen with an amine of the formula $HNR^7R^8$, cleavage of the thiazolopyrimidinone or pyrimidinobenzothiazolone nucleus occurs at the 5- or 4-positions respectively to form the desired compound of formula I(b). The reaction may be carried out in the presence or absence of a suitable solvent, such as water or ethanol, depending on the amine being used. Advantageously, the reaction medium contains a small amount of a suitable base, for example a quaternary ammonium hydroxide such as tetramethyl ammonium hydroxide, and preferably the reaction is carried out at the reflux temperature of the reaction medium.

The compounds of formula I(b) may alternatively be prepared in accordance with a further feature of the present invention by reaction of a compound of formula II with propiolyl chloride to produce an intermediate compound of the formula:

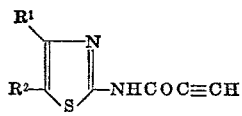

which on reaction with the amine $HNR^7R^8$ yields the desired compound of formula I(b). The first stage in this reaction is normally carried out at low temperatures of from $-20$ to $+20°$ C. by adding the propiolyl chloride slowly with agitation to the 2-aminothiazole. The resultant compound of formula IV, before or after purification, may then be added to the required amine and the reaction allowed to proceed at low temperatures such as those used in the first stage.

Compounds of formulae I(a) and I(b) possess useful anti-inflammatory activity and amoebicidal activity respectively at doses between 50 and 300 mg./kg. These compounds also possess a low oral toxicity which in terms of $LD_{50}$ in mice ranges from about 200 mg./kg. to $>1600$ mg./kg.

According to a feature of the present invention therefore, there is provided a method of treating inflammation or amoebiasis in animals, including humans, which comprises administering to said animal an effective dose of a compound of formula I possessing anti-inflammatory or amoebicidal activity. The effective dose for animals other than humans will normally be within the above-mentioned dosage range, whilst for humans the dose will normally be between 10 and 75 mg./kg. repeated until the condition is relieved. It will, of course, be appreciated that the human dosage regime will be determined by a physician in the light of all the relevant circumstances including the condition to be treated, the physical condition of the patient, the choice of compound to be administered and the route of administration and therefore the above dosage range is not intended to limit the scope of the invention in any way.

The compounds of formula I will normally be administered in composition form and accordingly the present invention also provides pharmaceutical compositions comprising at least one compound of formula I in association with a pharmaceutically acceptable carrier therefor.

The compositions of the present invention may be administered orally, parenterally or rectally in the form of, for example, tablets, capsules, suppositories or suspensions. Advantageously for this purpose, compositions may be provided in dosage unit form, preferably each dosage unit containing from 50 to 1000 mg., more advantageously 250 to 750 mg., of a compound of formula I.

In this specification the expression "dosage unit form" is used as meaning a physically discrete unit containing an individual quantity of the active ingredient, generally in admixture with a pharmaceutical diluent therefor or otherwise in association with a pharmaceutical carrier, the quantity of the active ingredient being such that one or more units are normally required for a single therapeutic administration or that, in the case of severable units such as scored tablets, at least one fraction such as a half or quarter of a severable unit is required for a single therapeutic administration.

The formulations of the present invention normally will consist of at least one compound of formula I mixed with a carrier, or diluted by a carrier, or enclosed or encapsulated by a carrier in the form of a capsule, sachet, cachet, paper or other container. A carrier or diluent may be a solid, semi-solid or liquid material which serves as a vehicle, excipient or medium for the active therapeutic substance. Some examples of the diluents or carriers which may be employed in the pharmaceutical formulations of the present invention are lactose, dextrose, sucrose, sorbitol, mannitol, starch, gum acacia, calcium phosphate, liquid paraffin, cocoa butter, oil of theobroma, alginates, tragacanth, gelatin, syrup B.P., methyl cellulose, polyoxyethylene sorbitan monolaurate, and methyl- and propyl-hydroxybenzoate. In the case of tablets, a lubricant may be incorporated to prevent sticking and binding of the powdered ingredients in the dies and on the punch of the tabletting machine. For such purpose, there may be employed for instance talc; aluminium, magnesium or calcium stearate; or mineral oil.

Certain of the compounds of formula I also possess anti-fungal activity useful for the control of plant pathogens, particularly *Botrytis cinerea*, the causative organism of grey mould or grapes.

The fungicidically active compounds of formula I can be employed for the protection of plants susceptible to pathogenic fungi and thereby prevent the onset of disease symptoms. They can likewise be used in the treatment of infected plants. When so used, the active compounds can be formulated as a solution, emulsion or emulsifyable concentrate, or as a dust. They are preferably formulated as a solution suitable for foliar spray application. Aqueous solutions of the active compounds at concentrations of from about 500 to about 4000 p.p.m. can be prepared with the aid of a solubilizing agent and are useful fungicidal spray solutions when applied to the foliage of susceptible plants. Likewise, aqueous emulsions of the compounds of the invention can be prepared in similar concentrations with the aid of an emulsifier and a solubilizing agent. The aqueous solutions and emulsions desirably contain a wetting agent to enhance the spreadability of the formulations over the leaf surface. Suitable emulsifying agents can be of the ionic or nonionic types, such as the condensation products of alkylene oxides with phenols and organic acids, polyoxyethylene derivatives of sorbitan esters, aralkyl and alkyl sulfonates and the like.

Concentrated dust formulations can be prepared by incorporating from about 10 to about 45 percent of a fungicidally active compound of formula I in a finely divided inert solid carrier, such as diatomaceous earth, fuller's earth, bentonite, talc, and the like. Such dust formulations can be used directly or they can be further diluted with inert carrier to achieve lower concentrations of the active compound. Alternatively dispersing and/or wetting agents may be incorporated to form wettable powder concentrates which subsequently may be dispersed in water or other aqueous carriers to form spray compositions.

The compounds of formula I(b) are also active against fungi causing dermatomycoses in human and animals, such as *Trychophyton mentagrophytes*. In use in the treatment of dermatomycoses, the compounds of formula I(b) may be formulated as solid, semi-solid or liquid compositions containing, in addition to the active ingredient, suitable pharmaceutically acceptable adjuvants such as wetting agents, dispersing agents, and solubilising agents. Exemplary of such compositions are creams, ointments, dusting powders, tinctures, antiseptic soaps and shampoos, all of which are prepared in a well known manner and preferably contain from 0.5 to 10% of the active ingredient.

The following examples will further illustrate the preparation of the compounds of this invention:

EXAMPLE 1

Ethyl propiolate (1.0 g.) was added to a warm solution of 2-aminothiazole (10.0 g.) in ethanol (100 ml.). The solution was heated reflux for 8 hours during which time a solid was precipitated. The reaction mixture was cooled, filtered and the solid obtained re-crystallized from dimethylformamide to yield 7H-thiazolo[3,2-a]pyrimidin-7-one, M.P. 263–266° C. (dec.). Yield 7.7 g., 51%.

The reaction was repeated but the refluxing was carried out in the presence of a trace (3 drops) of a 25% aqueous solution of tetramethylammonium hydroxide. The desired product was obtained in a yield of 9.7 g., 64%.

EXAMPLE 2

By the method of Example 1, 3-methyl-7H-thiazolo-[3,2-a]pyrimidin-7-one, M.P. 284–287° C. (dec.), yield 62%, was prepared from methyl propiolate and 2-amino-4-mthylthiazole.

EXAMPLE 3

By the method of Example 1, 3,5-dimethyl-7H-thiazolo-[3,2-a]pyrimidin-7-one, M.P. 265–268° C. (dec.), yield 61%, was prepared from β-methyl propiolic acid and 2-amino-4-methylthiazole.

EXAMPLE 4

By the method of Example 1, 3-methyl-5-phenyl-7H-thiazolo[3,2-a]pyrimidin-2-one, M.P. 270–272° C. (dec.), yield 47%, was prepared from ethyl β-phenylpropiolate and 2-amino-4-methylthiazole.

EXAMPLE 5

By the method of Example 1, 3-methyl-5-carbomethoxy-7H-thiazolo[3,2-a]pyrimidin-7-one, M.P. 145–147° C. (dec.), yield 24%, was prepared from acetylene dicarboxylic acid dimethyl ester and 2-amino-4-methylthiazole.

EXAMPLE 6

By the method of Example 1, 3-phenyl-7H-thiazolo[3,2-a]pyrimidin-7-one, M.P. 236–238° C. (dec.) yield 29%, was prepared from ethyl propiolate and 2-amino-4-phenylthiazole.

EXAMPLE 7

By the method of Example 1, 2H-pyrimidino[2,1-b] benzothiazole-2-one, M.P. 272–275° C. (dec.), yield 69%, was prepared from ethyl propiolate and 2-aminobenzothiazole.

EXAMPLE 8

By the method of Example 1, 8-methyl-2H-pyrimidino[2,1-b]benzothiazole - 2-one, M.P. 295–297° C. (dec.), yield 56%, was prepared from 2-amino-6-methylbenzothiazole and ethyl propiolate.

EXAMPLE 9

By the method of Example 1, 4-methyl-8-methoxy-2H-pyrimidino[2,1-b]benzothiazole-2-one, M.P. 267–270° C. (dec.), yield 34%, was prepared from 2-amino-6-methoxybenzothiazole and ethyl β-methylpropiolate.

EXAMPLE 10

By the method of Example 1, 8-methoxy-2H-pyrimidino[2,1-b]benzothiazole-2-one, M.P. >300° C., was prepared from 2-amino-6-methoxybenzothiazole and ethyl propiolate.

EXAMPLE 11

By the methods described in Examples 1 to 11, there were prepared

5 - methyl-7H-thiazolo[3,2-a]pyrimidin-7-one, M.P. 264–8° C.
5-phenyl-7H-thiazol
5 - phenyl - 7H - thiazolo[3,2 - a]pyrimidin-7-one, M.P. M.P. 191–4° C.
4 - methyl - 2H - pyrimidino[2,1 - b]benzothiazole-2-one, M.P. 244–5° C.
4 - phenyl - 2H - pyrimidino[2,1 - b]benzothiazole-2-one, M.P. 237–8° C.
6 - methoxy - 2H-pyrimidino[2,1-b]benzothiazole-2-one, M.P. 245–6° C. (dec.)

EXAMPLE 12

A mixture of 7H-thiazolo[3,2-a]pyrimidin-7-one (1.5 g.), 70% aqueous ethylamine solution (50 ml.) and a 25% aqueous solution of tetramethyl ammonium hydroxide (5 drops) was heated under reflux for 7 hours, the solid dissolving slowly during this time. Evaporation of the water under reduced pressure and recrystallization of the residue from ethanol yielded crystals of 2-(β-ethylaminoacryloyl)imino - Δ⁴ - thiazoline (1.15 g., 59), M.P. 208–210° C. (dec.).

EXAMPLE 13

Using the method of Example 12, the following compounds were prepared from the appropriate starting materials:

2 - (β - n.butylaminoacryloyl)imino - Δ⁴-thiazoline, M.P. 152–154° C., in 52% yield.
2 - (β - piperidinoacryloyl)imino - Δ⁴ - thiazoline, M.P. 201–203° C. in 72% yield.
2 - (β - ethylaminoacryloyl)iminobenzothiazoline, M.P. 175–178° C., in 72% yield.
2 - (β - n.butylaminoacryloyl)iminobenzothiazoline, M.P. 202–204° C., in 25% yield.
2 - (β - pyrrolidinoacryloyl)iminobenzothiazoline, M.P. 215–217° C. (dec.), in 68% yield.
2 - (β - pyrrolidinoacryloyl)iminobenzothiazoline, M.P. 215–217° C. (dec.), in 68% yield.
2 - (β - piperidinoacryloyl)iminobenzothiazoline, M.P. 219–221° C. (dec.), in 65% yield.
2 - (β - n.butylaminoacryloyl)imino - 6 - methylbenzoline, M.P. 201–203° C.
2 - (β - n.butylaminoacryloyl)imino - 6 - methoxybenzothiazoline, M.P. 176–178° C.

EXAMPLE 14

A solution of propiolyl chloride (4.43 g.) in toluene (20 ml.) was added dropwise to a stirred solution of 2-aminothiazole (5.0 g.) in ether (200 ml.) kept at −10°. When the addition was complete (30 minutes), the mixture was stirred at room temperature for a further 30 minutes and then filtered. The resultant solid was washed with ether and dried over phosphorus pentoxide. The solid (100 mg.) was added to piperidine (2 ml.) at 0° C. and the solution stood at room temperature overnight. The piperidine was removed at room temperature under reduced pressure and the residue recrystallised from ethanol to yield 2 - ($\beta$ - piperidinoacryloyl)imino-$\Delta^4$-thiazoline, which was identical with the material produced by the alternative synthetic route described in Example 12.

For the avoidance of doubt, the numbering used in the naming of the foregoing compounds is as follows:

Thiazolopyrimidinones

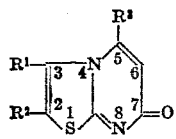

Pyrimidinobenzothiazolones

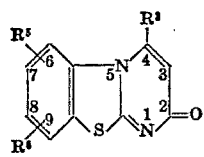

2-($\beta$-aminoacryloyl)imino-$\Delta^4$-thiazolines

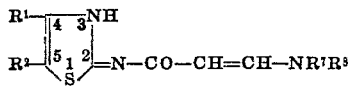

2-($\beta$-aminoacryloyl)iminobenzothiazolines

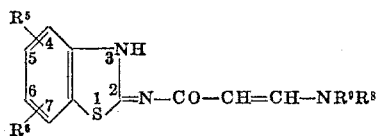

where $R^5$ and $R^6$ represent the optional substituents on the phenyl ring.

I claim:
1. A compound selected from the group consisting of 3,5-dimethyl-7H-thiazolo[3,2-a]pyrimidin - 7 - one and 3-methyl-5-phenyl-7H-thiazolo[3,2-a]pyrimidin-7-one.

References Cited

Andrew et al.: J. Het. Chem. 4 (4), 577–81 (1967).
Ohta: Chemical Abstracts 46, 8099c (1952).

DONALD G. DAUS, Primary Examiner

R. V. RUSH, Assistant Examiner

U.S. Cl. X.R.

260—240, 293.57, 305, 306.7; 424—251, 267, 270

PO-1050
(5/69)

UNITED STATES PATENT OFFICE
CERTIFICATE OF CORRECTION

Patent No. 3,813,360　　　　Dated May 28, 1974

Inventor(s) Delme Evans

It is certified that error appears in the above-identified patent and that said Letters Patent are hereby corrected as shown below:

In column 2, line 18, "3-isobutyoxy-5" should read -- 3-isobutoxy-5 --; line 49, "$\Delta^4$thiazoline" should read --$\Delta^4$-thiazoline--; line 50, that portion of the name reading ")-imino-$\Delta^4$" should read --)imino-$\Delta^4$--; line 52, that portion of the name reading "2-(β-ethylaminoacrylol)imini-4-" should read -- 2-(β-ethylaminoacryloyl)imino-4 --; line 53, that portion of the name reading "2-(β-ethylaminoacrylol)" should read -- 2-(β-ethylaminoacryloyl) --. Column 4, line 54, "or grapes" should read --on grapes--. Column 5, line 34, "heated reflux" should read --heated under reflux--; line 48, "4-methylthiazole." should read -- 4-methylthiazole. --. Column 6, line 26, "5-phenyl-7H-thiazol" should be deleted; line 27, "M.P." should be deleted; line 45, "(1.15 g., 59)" should read --(1.15 g., 59%)--; lines 62 and 63, delete "2-(β-pyrrolidinoacryloyl)imino-benzothiazoline, M.P. 215-217°C. (dec.), in 68% yield."; line 66, that portion of the name reading "6-methylbenzo-" should read -- 6-methylbenzothiazo- --.

Signed and sealed this 17th day of September 1974.

(SEAL)
Attest:

McCOY M. GIBSON JR.
Attesting Officer

C. MARSHALL DANN
Commissioner of Patents